(12) United States Patent
Williams

(10) Patent No.: US 11,700,426 B2
(45) Date of Patent: Jul. 11, 2023

(54) VIRTUAL PLATFORM FOR RECORDING AND DISPLAYING RESPONSES AND REACTIONS TO AUDIOVISUAL CONTENTS

(71) Applicant: Firefly 14 LLC, Ocean Pines, MD (US)

(72) Inventor: Paul Williams, Ocean Pines, MD (US)

(73) Assignee: FIREFLY 14, LLC, Ocean Pines, MD (US)

( * ) Notice: Subject to any disclaimer, the term of this patent is extended or adjusted under 35 U.S.C. 154(b) by 0 days.

(21) Appl. No.: 17/182,687

(22) Filed: Feb. 23, 2021

(65) Prior Publication Data

US 2022/0272416 A1    Aug. 25, 2022

(51) Int. Cl.
*H04N 21/4788* (2011.01)
*H04N 21/8547* (2011.01)
*H04N 21/43* (2011.01)

(52) U.S. Cl.
CPC ... *H04N 21/4788* (2013.01); *H04N 21/43079* (2020.08); *H04N 21/8547* (2013.01)

(58) Field of Classification Search
None
See application file for complete search history.

(56) References Cited

U.S. PATENT DOCUMENTS

| | | | | |
|---|---|---|---|---|
| 2003/0182663 | A1* | 9/2003 | Gudorf | H04N 21/43615 725/135 |
| 2006/0122834 | A1 | 6/2006 | Bennett | |
| 2009/0300475 | A1* | 12/2009 | Fink | H04N 21/4781 715/230 |
| 2013/0152000 | A1 | 6/2013 | Liu | |
| 2014/0325557 | A1* | 10/2014 | Evans | H04N 21/4307 725/34 |
| 2018/0012230 | A1 | 1/2018 | Feigenblat | |
| 2020/0059704 | A1* | 2/2020 | Mikoshiba | A63F 13/86 |
| 2020/0159398 | A1* | 5/2020 | Shimomura | G09G 5/377 |
| 2020/0351527 | A1* | 11/2020 | Saito | H04N 21/4316 |

* cited by examiner

*Primary Examiner* — William J Kim
(74) *Attorney, Agent, or Firm* — Shih IP Law Group, PLLC

(57) ABSTRACT

A method and a system for receiving a user's selection of a content, retrieving data about the content, tracking content consumption, launching a reactive module based on input from the user, registering a timestamped response of the user, the response comprising a graphic symbol is provided. The method may be further comprise receiving content-retrieving information from a second user, searching contents to identify a candidate for the second user's consumption, receiving a selection of a content from the candidate, tracking a position of the content that is selected and being consumed by the second user, launching the reactive module on a second client device based on input from the second user. The virtual platform provides an electronic venue of dynamic communications for content consumers, where users experience pseudo-realtime interactions by seeing the virtual platform's reconstruction of other users' responses that shows reacting users' emotional status.

3 Claims, 15 Drawing Sheets

VIRTUAL PLATFORM FOR RECORDING AND DISPLAYING RESPONSES AND REACTIONS TO AUDIOVISUAL CONTENTS

BACKGROUND

In today's interconnected environment, anyone who has a cable, a TV, internet, a mobile phone, tablets, or a smart watch, can enjoy viewing media contents or playing games in any place of choice, at any moment. The content consumption enjoys a far greater choice than before and accommodates each user's wish to experience in different devices, and by any convenient method. Ironically, the individualized content consumption has created a single-user experience, detached from other members of a community.

Also, public health emergencies like novel coronavirus pandemic have forced public venues to shut down. Theater lovers, sport fans, music fans, and the like, miss togetherness that they used to feel in indoor public facilities. Friends and family members desire to share exciting moments together even if they are separated from each other. There is a need for a system to connect those who are spatially and temporally distanced and establish their synchronized interactions at an emotional level.

Along with the diversification of content consumption modalities as described above, computer-mediated communications have provided tools to develop social interactions among users. Recently, forums such as Instagram have emerged to realize real-time inter-consumer connections. Social Media Platform (SMP) and Social Networking Site (SNS) provide a virtual platform for contemporaneous communication among users. However, no previously known system has offered a virtual platform for sharing pseudo-synchronized experiences at an emotional level when users independently consume a content in different locations or at different times. Additionally, no previous system has offered an online reactive module optimized for instantaneous emotional interactions.

DESCRIPTION

The disclosure of the instant application relates to a virtual platform for recording and displaying users' responses and reactions. More particularly, the instant disclosure relates to a system, a method, and a non-transitory computer-readable medium having stored thereon computer-executable instructions, for searching a content, for providing a platform, users of which virtually exchange reactions to a content as if they were consuming the content at the same time and as if they were interacting with each other. The virtual platform records users' comments and graphic symbols, including the user's emotional reactions and presents users' responses in accordance with users' exposure to the content as well as user characteristics. The virtual platform users feel the sense of closeness through mutual emotional expressions and pseudo-synchronized interactions.

DESCRIPTION OF THE RELATED ART

SMP was born as a bulletin board system in 1978. Changes and innovations have been made to fill the need for a more inclusive platform and improved user experience. YouTube® was created in 2005 when there was no service for easy uploading and sharing of videos. Instagram® emerged in 2010 to let users share photos in as simplified a manner as a click of keys. These SMPs have been a potent communication and advertisement tool for reaching target audiences in an efficient way. Finally, SNS was introduced around 2003. SNS facilitated user-to-user interactions, and changed basic methods of communication.

Typical services offered by SMP or SNS have several limitations which create constraints and ineffectiveness to users. For example, as a business, SMP and SNS make profits by charging fees on subscribers' use of communications: the selected channel of communication; the placement of advertisement; the increased visibility of a message, etc. Thus, electronic communications are sold at the price decided by platforms, and the distribution of information is set by a sender of a message in most cases. Apart from direct messaging, communications are largely defined by a sender, a content provider, an advertiser, and not by recipients. Content consumers often lack modes of communication to express their response to the content.

In addition, a typical SMP platform does not allow viewers to post a comment in a timestamped manner, by selecting a particular point of a content. Thus, even if a content consumer can leave a response, its connection to the moment of excitement is lost. Other users find it difficult to relate to the response because the response is detached from the context of content consumption. The effectiveness of communication is greatly diminished.

Another related limitation is SMP's failure to synchronize the presentation of other consumers' responses with a user's content consumption. On SMP, a content consumer cannot interact with another consumer unless a content is viewed simultaneously, and users react simultaneously. When a content is consumed by users at different times, sense of interconnection is lost. There is a need for a platform that achieves a virtually reciprocal electronic communication among distanced users.

Further, features available at existing platforms are not yet to realize communications about feelings, or physical and psychological statuses of content consumers. In contrast to face-to-face conversation, sensory information is not relayed by electronic communications. As a way to realize an engaging dialogue, effective emotional bonding is desired, but currently missing.

As such, current SMPs and SNSs fail to achieve multi-directional, dynamic, engaging electronic communications among content consumers. There is a need for a communication platform that delivers a pseudo-synchronized content experience and allows users to interact emotionally through dynamic conversations with other users.

SUMMARY

The virtual platform disclosed in the present application obviates the above-mentioned disadvantages by providing a virtual platform that implements a method of recording and displaying a user's response to a content in a pseudo-synchronized manner. The virtual platform described herein opens an electronic venue of dynamic communications for content consumers, unconstrained by the spatial or temporal distance among them.

According to one aspect of the disclosed technology, a method is provided for receiving a user's selection of a content, retrieving data about the content from the database, tracking a position of a content being consumed by the user, launching a reactive module of the virtual platform on a client device, based on input from the user, registering a timestamped response of the user, the response comprising a graphic symbol.

The method may include receiving content-retrieving information from a second user, searching contents in the database to identify a candidate for the second user's consumption based on the content-retrieving information, receiving from the second user, a selection of a content from the candidate, tracking a position of the content that is selected and being consumed by the second user, launching the reactive module on a second client device based on input from the second user. The method may further include determining when and how to display one or more components of the response in the reactive module of the second client device, when the content selected and consumed by the user is identical to the content selected and consumed by the second user, when the second user's content consumption occurs asynchronously from the user's content consumption, and when the reactive module of the second client device is synchronized with the second user's content consumption. The method may include providing the user with an input modality for creating the response, when the graphic symbol indicates the user's emotional reaction at a position of the content at which the user reacted.

At another aspect of the disclosed technology, a system comprising a client device and a virtual platform, is disclosed. The processor of the virtual platform is configured to: receive a user's selection of a content; retrieve data about the content from the database; track a position of the content that is being consumed by the user; launch a reactive module on the client device based on input from the user; and register a response of the user to the content, when the response comprises a graphic symbol. The processor may be further configured to receive content-retrieving information from a second user, search contents in the database to identify a candidate for the second user's consumption based on the content-retrieving information, receive from the second user, a selection of a content from the candidate, track a position of the content that is selected and being consumed by the second user, launch the reactive module on a second client device based on input from the second user.

According to yet another aspect of the present disclosure, a non-transitory computer-readable medium having stored thereon computer-executable instructions that cause a processor of a virtual platform to implement a method for recording and displaying a user response to a content, is disclosed. The method executed by the non-transitory computer-readable medium comprises receiving a user's selection of a content, retrieving data about the content from the database, tracking a position of a content being consumed by the user, launching a reactive module of the virtual platform on a client device, based on input from the user, registering a timestamped response of the user, the response comprising a graphic symbol.

The method may include receiving content-retrieving information from a second user, searching the database to identify a candidate for the second user's consumption based on the content-retrieving information, receiving from the second user, a selection of a content from the candidate, tracking a position of the content that is selected and being consumed by the second user, launching the reactive module on a second client device based on input from the second user. The method may further include determining when and how to display one or more components of the response in the reactive module of the second client device, when the content selected and consumed by the user is identical to the content selected and consumed by the second user, when the second user's content consumption occurs asynchronously from the user's content consumption, and when the reactive module of the second client device is synchronized with the second user's content consumption.

BRIEF DESCRIPTION OF THE DRAWINGS

The foregoing and a better understanding of the instant disclosure will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

Figure 1:
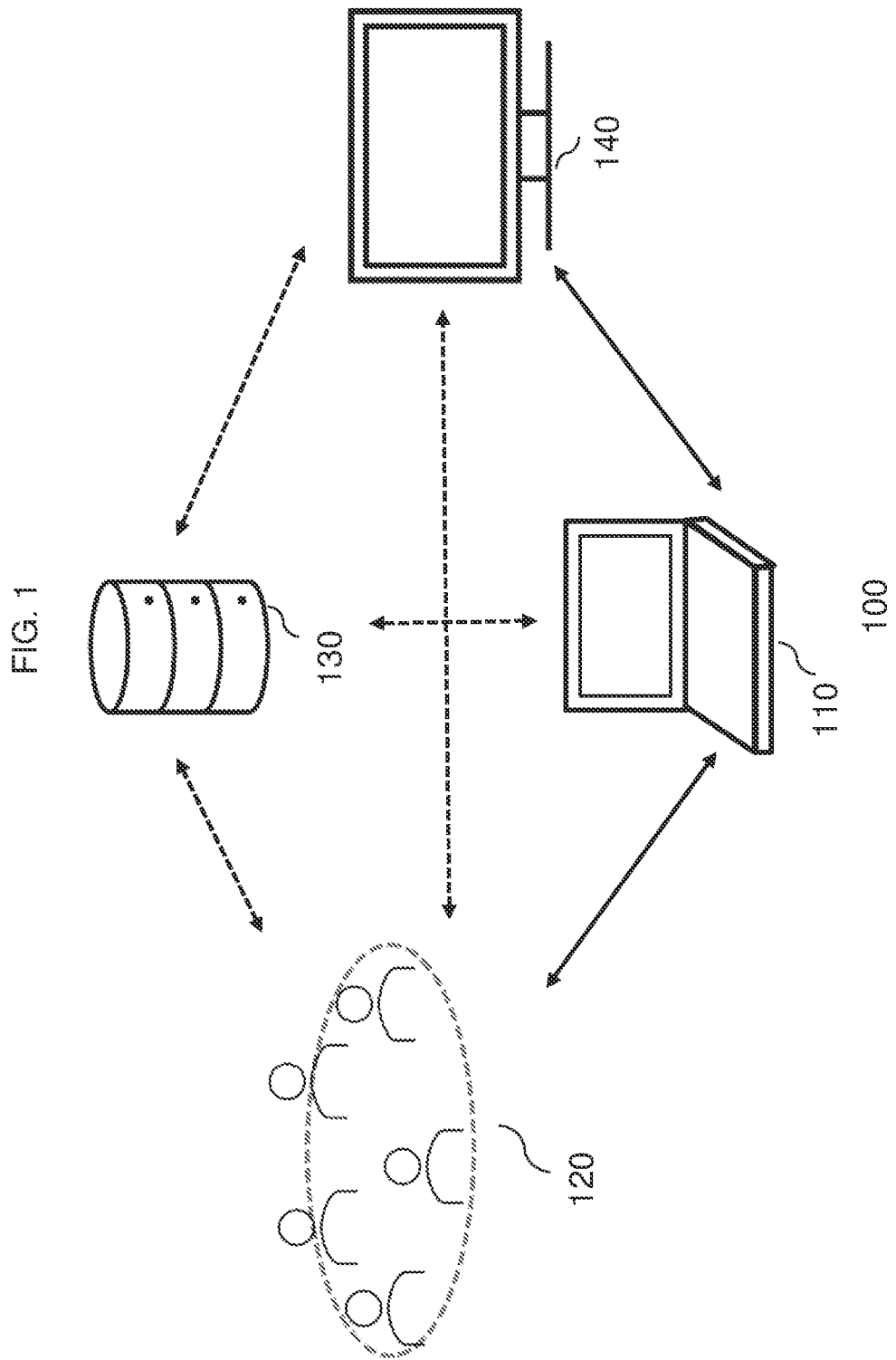
FIG. 1 is a system diagram of one preferred embodiment. A client device 110 communicates with a virtual platform 120 and a content server 130, and with a display device 140. A display device 140 is optionally coupled with the client device 110. In this embodiment, the display device 140 receives a content from a content server 130. Content consumption at the display device 140 is tracked by the virtual platform 120 and reflected to operations at the client device 110.

In the following description, for the purposes of explanation, numerous specific details are set forth in order to provide a thorough understanding of various embodiments of the instant disclosure. It will be apparent, however, to one skilled in the art that embodiments of the present disclosure may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. Each block of the flowchart can be implemented, for example, by computer readable program instructions, as well as combinations of blocks can be implemented. More than one methods may be shown in one flowchart. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In this disclosure, terms "register" and "record" are interchangeably used to mean any storing, retention, or registration of a user's input, data, mathematical formulae, products of computation, and the like, using a suitable medium for such purpose.

Terms "display" and "play" are interchangeably used to mean a presentation of an audiovisual content, signal, or data. Terms "show" and "present" are interchangeably used to mean a presentation of data, information, a status, and the like. Terms "provide," "furnish," and "offer" may also mean a presentation of data, information, a status, and the like, or furnishment, transmission, or performance of a function, an option, a process, a method, a system, an object, or a content.

The instant disclosure as will be described in greater detail below provides (1) a method of recording and displaying a user's response to a content, (2) a system of recording and displaying a user's response to a content, and (3) a non-transitory computer-readable medium containing computer-executable instructions that cause a processor of the virtual platform to record and display a user's response to a content. The present disclosure provides various embodiments as described below. However, it should be noted that the present disclosure is not limited to the embodiments described herein, but could extend to other embodiments as would be known or as would become known to those skilled in the art.

In preferred embodiments of the instant disclosure, the virtual platform comprises a processor and a database. In the alternative, the virtual platform further comprises a content server. In another example, the virtual platform further comprises another server, an interface, and a storage.

Using the virtual platform 120, a user can consume a content in at least a few different ways. As an exemplary embodiment, a client device 110 receives a content from a third-party content provider. The user may subscribe to traditional broadcasting services such as cable, or to internet-based content providers such as YouTube. After or before a user signs into the virtual platform 120, the user may provide content-retrieving information, and the virtual platform 120 may search its database to identify a candidate for the user's content consumption. Alternatively, the user may search available materials from a list supplied by in the database by a title or a genre of contents. The virtual platform 120 may establish data communication via a communication network with a content server 130 controlled by the content provider, in addition to a communication network with the client device 110. Further, the virtual platform may establish access of the client device 110 to a content, offered by the content provider.

As an alternative embodiment, the client device 110 receives a content directly from the virtual platform 120. A content may be stored at and delivered from a storage 390 of the virtual platform 310, or a content server 380 of the virtual platform 310. In that circumstance, the virtual platform 310 may establish data communication via a communication network with a communication interface of a client device 350.

Examples of the client device 350 include a mobile phone or a smartphone, a personal computer or a laptop, a personal digital assistant (PDA) or a tablet, a smart watch, an entertainment center of a vehicle, a mobile theater, and other smart devices. The present disclosure is not limited to any particular type of client device 350, and may vary accordingly.

The virtual platform 220 may establish data communication via a communication network with more than one client devices 210a, 210b, 210c, 210d, 210e. A content may be provided from a content server 230 of a third-party content provider. Alternatively, a server or a storage of the virtual platform 220 may furnish contents to client devices 210a, 210b, 210c, 210d, 210e.

Communication networks include a wired or wireless network for data communication. The data communication may be achieved by using web services technology, for example, Web services Description Language (WSDL). The communication networks may include any subsystem for exchanging data such as the Internet, intranet, extranet, wide area network (WAN), local area network (LAN), Restful web services, JAVAScript Object Notation (JSON), Extensible Mark-up Language (XML)-based communication network, Simple Object Access Protocol (SOAP)-based Services and satellite communication network. Further, the communication networks can be other types of networks such as interactive television (ITV). Wireless networks including LTE, 3G, 4G, 5G, and 6G are compatible with the present disclosure. According to one or more embodiments, the communication networks may be the same or different types of networks. A network connection may be established for a variety of services as broadband Internet connectivity and Voice over Internet Protocol (VoIP) telephony services.

As one exemplary embodiment, a content search may be conducted based on a user's input of a year of release into a user interface of the client device 110. The virtual platform may screen contents registered in its database for a matching entry. Upon identifying contents that match the input information, the virtual platform 120 may provide the user with a candidate(s). Additional information about the candidate such as a language spoken in the candidate or its total duration may be included to assist the user's selection.

When the user selects a content from the candidate, the virtual platform 120 receives the user's selection, and retrieves information about the selected content. The virtual platform 120 tracks a position of the content that is being consumed by the user. In one or more embodiments, the content is consumed at a display device 140, and the virtual platform 120 will establish data communication with the content server 130. Thus, the content being consumed by the user is tracked by the virtual platform 120 and synchronized with data processing at the client device 110.

In a preferred embodiment, a content is supplied through I/O adapter 370. According to such embodiment, a content is offered through a content player, a component of the virtual platform. And data transmission to the content player is synchronized with data processing at a client device 350.

According to some embodiments, a reactive module of the virtual platform may be launched manually, or automatically based on information input by the user. As a content is being consumed on the client device 350, the virtual platform 310 retrieves previously registered data about the content, including previous user responses. Such data may come from a storage 390 or an ROM 340.

A user response may be timestamped according to a particular point of a content to which the user reacted. The reactive module reconstructs previous responses to display them when the user's content consumption reaches the point to which previous users reacted.

In one embodiment, the reactive module 1120 shows a title 1115 of a content being consumed, as well as a position of a content being consumed on a time bar 1150. Above the time bar 1150, graphic symbols (emojis) 1125 may be shown in locations which their timestamps correspond to.

In some embodiments, the reactive module 1120 will display only graphic symbols 1125 whose timestamps are close to the point of the user's content consumption above the time bar 1150 as default. In some embodiments, the user may disconnect the reactive module 1120 from the user's content consumption and de-synchronize the display. In such embodiments, the user may pause the tracking of content consumption and move a pointer on the time bar 1150 to see graphic symbols whose timestamps are close to the pointer.

In preferred embodiments, the reactive module 1120 shows previously entered comments whose timestamps are up until the position of the user's content consumption. In some embodiments, a comment made by another user appears when the user's content consumption reaches the comment's timestamp, then stays for a few minutes from the timestamp, and disappears as the user further consumes the content.

In other embodiments, the user can turn off the display of verbal comments by selecting "CLOSE CONVERSATION" 1135. In such embodiments, graphic symbols 1125 of other users' responses are displayed.

Figure 11:
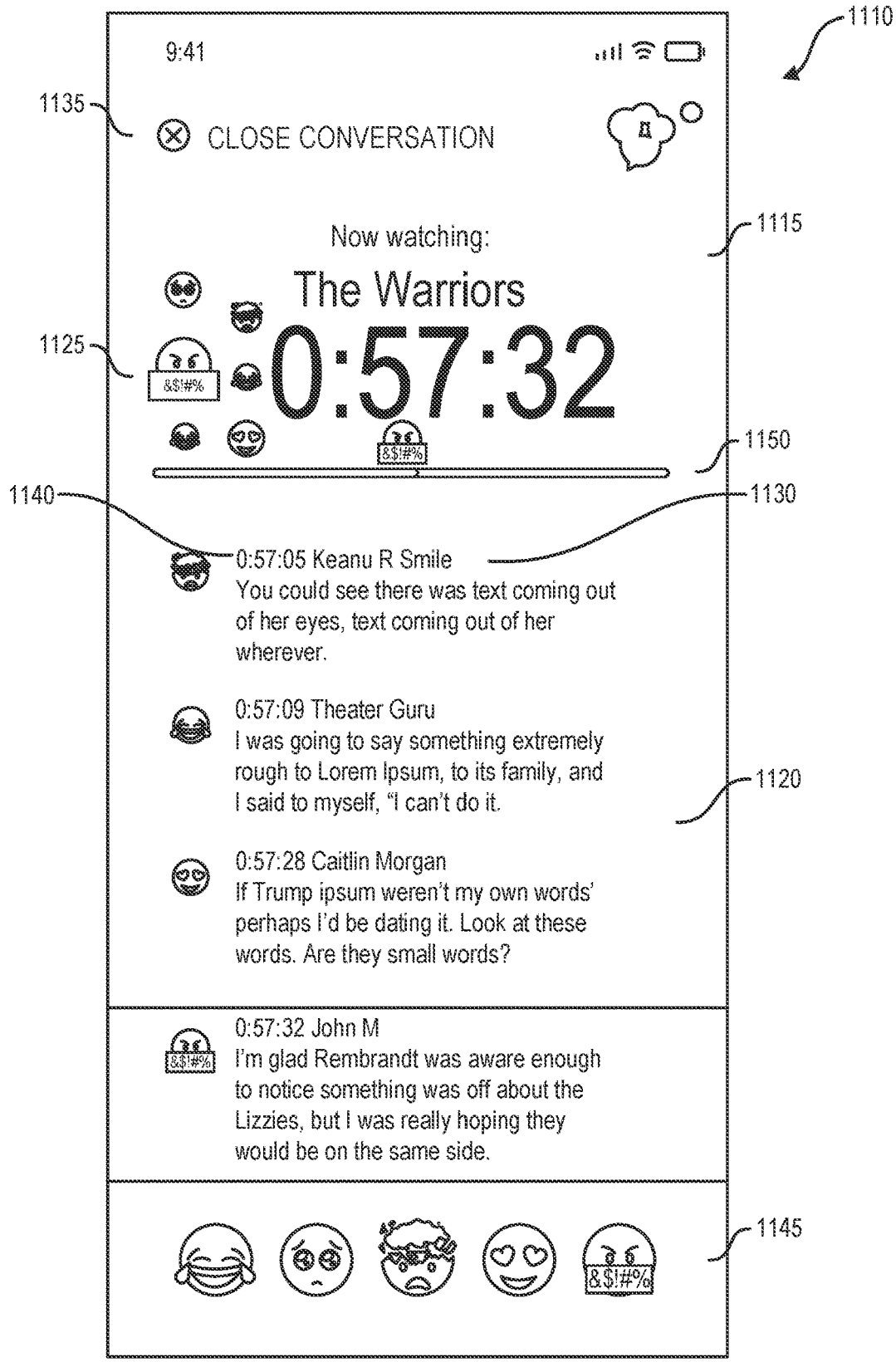
FIG. 11 is a screenshot of the second client device 1110. In this example, the virtual platform's reactive module 1120 is launched on a mobile phone 1110.

FIG. 11 is a screenshot of a screen of a client device 1110 which shows previous user responses, in accordance with some embodiments of the present disclosure. In this example, a reactive module 1120 is launched and appears in a lower part of the client device 1110. The user is watching "The Warriors" on a display device, for example, television. A title of the content 1115, a time bar 1150, and graphic symbols 1125 may be displayed on the reactive module 1120. The user can read other users' comments ("You could see there was text coming out of her eyes, text coming out of her wherever") and see usernames 1130 and timestamps 1140 above the comments.

In one embodiment, a user may start creating a response to a content by simply selecting one of the emojis listed on the bottom of the screen 1145 when the selected emoji represents the user's emotion. The reactive module 1120 may open a response maker for the user's input of a verbal comment.

Figure 12:
FIG. 12 is a screenshot of a client device 1210. In this example, the virtual platform's reactive module 1220 is launched on a mobile phone 1210.

FIG. 12 is a screenshot of a screen of a client device 1210 (ex. a smartphone). In accordance with several embodiments of the present disclosure, the reactive module 1220 is launched on the client device 1210. A user is making a response to the content "Warrior" 1215. The user is typing a verbal comment 1230 using a response input unit, i.e., keyboard, 1250 on the client device.

According to some embodiments of the present disclosure, a user who intends to leave a response to a content can launch a response input unit 1330 of the reactive module 1335, by clicking an icon 1340 shown on a screen of the client device.

Figure 13:
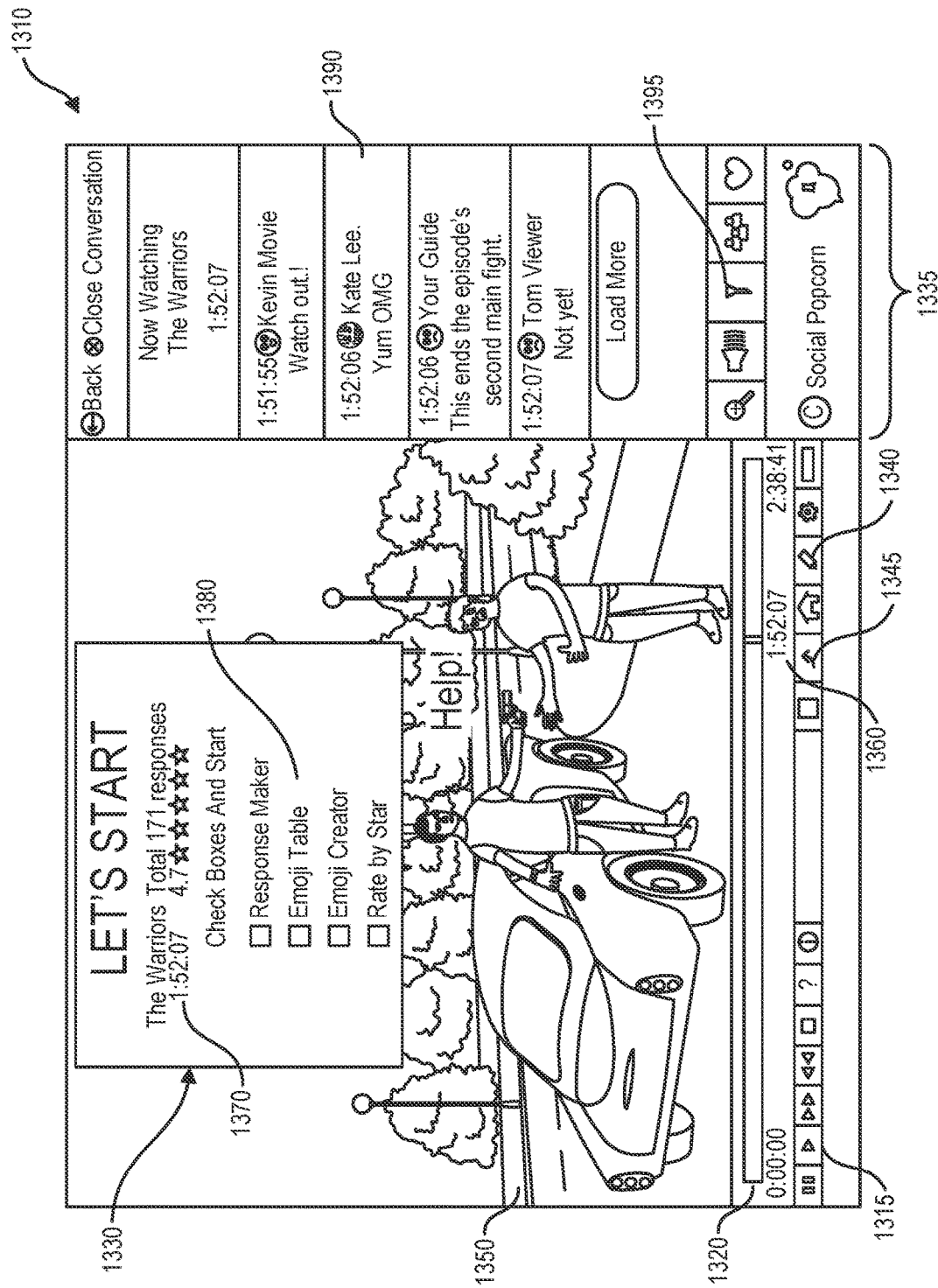
FIG. 13 is a screenshot of a screen of a client device 1310. In this example, a user started creating a response by clicking a box 1340.

In FIG. 13, the reactive module 1335 is running on the same window with a content player 1350. Alternatively, the virtual platform does not include a content player 1350, and a content can be consumed on a display device. In some embodiments, the client device 1310 may launch the reactive module 1335 and a content player 1350 in separate windows. The timestamp 1370 indicates a position of the content that the user is reacting to. The position of the content is also shown 1360 on a time bar 1320 of the content player 1350.

Still at FIG. 13, previous user responses are shown 1390 in the reactive module 1335. According to some embodiments of the present disclosure, a filtering function is available upon selection of "Filter" 1395. After filtering is applied, the reactive module 1335 may display only responses that meet criteria as set by the user. In such embodiments, the user can select multiple factors, including another user's location, a date of a response, and relationships of the user with other users.

The response input unit 1330 may show various input modalities 1380 as options, and a user can choose one or more of the modalities based on what components to include in a response and how to make a response. A response maker is shown as one of modalities 1380 in the response input unit.

As one representative implementation, a user of the virtual platform may export responses displayed in the reactive module 1335 to any external medium by clicking a "Share" button 1345 on a screen of the client device 1310.

Figure 14:
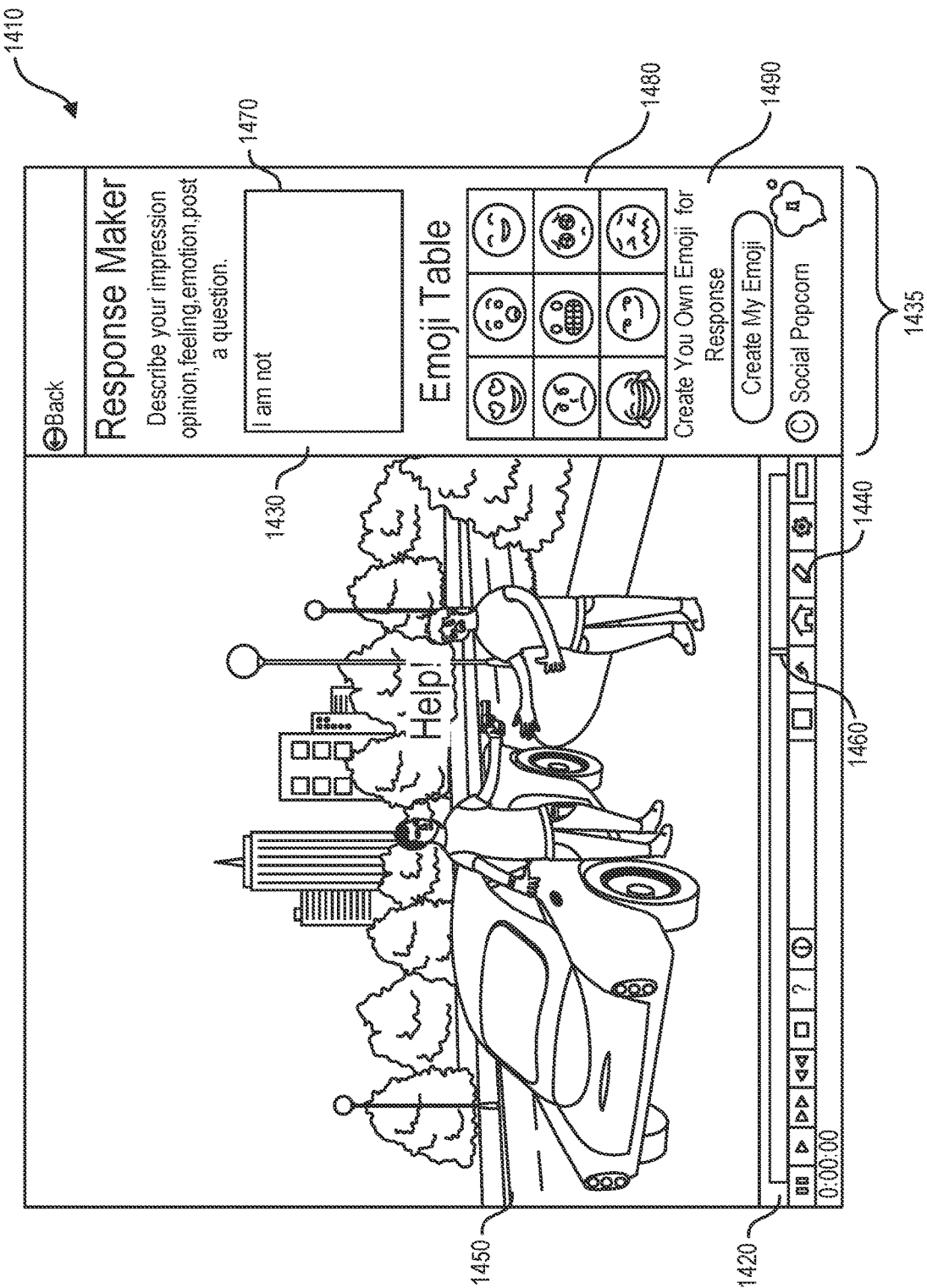
FIG. 14 is a screenshot of a screen of a client device 1410 after a user selects to create a response. In this example, a response input unit 1430 is shown on the right-hand side of the window, including a response maker 1470 and an emoji table 1480. The emoji table is used to offer a candidate emoji to the user. Alternatively, an emoji creator may be selected to produce a personalized emoji.

In FIG. 14, the response input unit 1430 offers a response maker 1470 for making a verbal comment and an emoji table 1480 for selecting a graphic symbol. A user may leave a verbal comment by typing in a field below "Response Maker." Any available and suitable user interface may be used as a medium for entering a verbal comment and/or a graphic symbol, including an I/O interface of the virtual platform, a user interface of a client device, a speech recognition software.

Preferred embodiments of the present disclosure include a virtual platform having a processor configured to provide a user with a table or a list of graphic symbols 1480 and register the user's selection. Alternatively, a user can click "Create My Emoji" button 1490 to create an original graphic symbol.

The graphic symbol may indicate the user's status such as phycological or physiological statuses, emotions, and sentiments, as associated with the user's content consumption. An emoji is a mark or one type of graphic symbol that expresses one's feelings in an abstractive manner. The response input unit 1430 can include an emoji table 1480 as a default.

For example, if the user finds the content funny, an emoji depicting laughter of various degrees may be chosen. In some embodiments, a graphic symbol may indicate demographics of the user. In a table 1480, dynamic images, 3D images, marks, and symbols for popular groups/bands may be included. In preferred embodiments, the virtual platform attaches a timestamp to each component of the user's response, including a graphic symbol.

Figure 15:
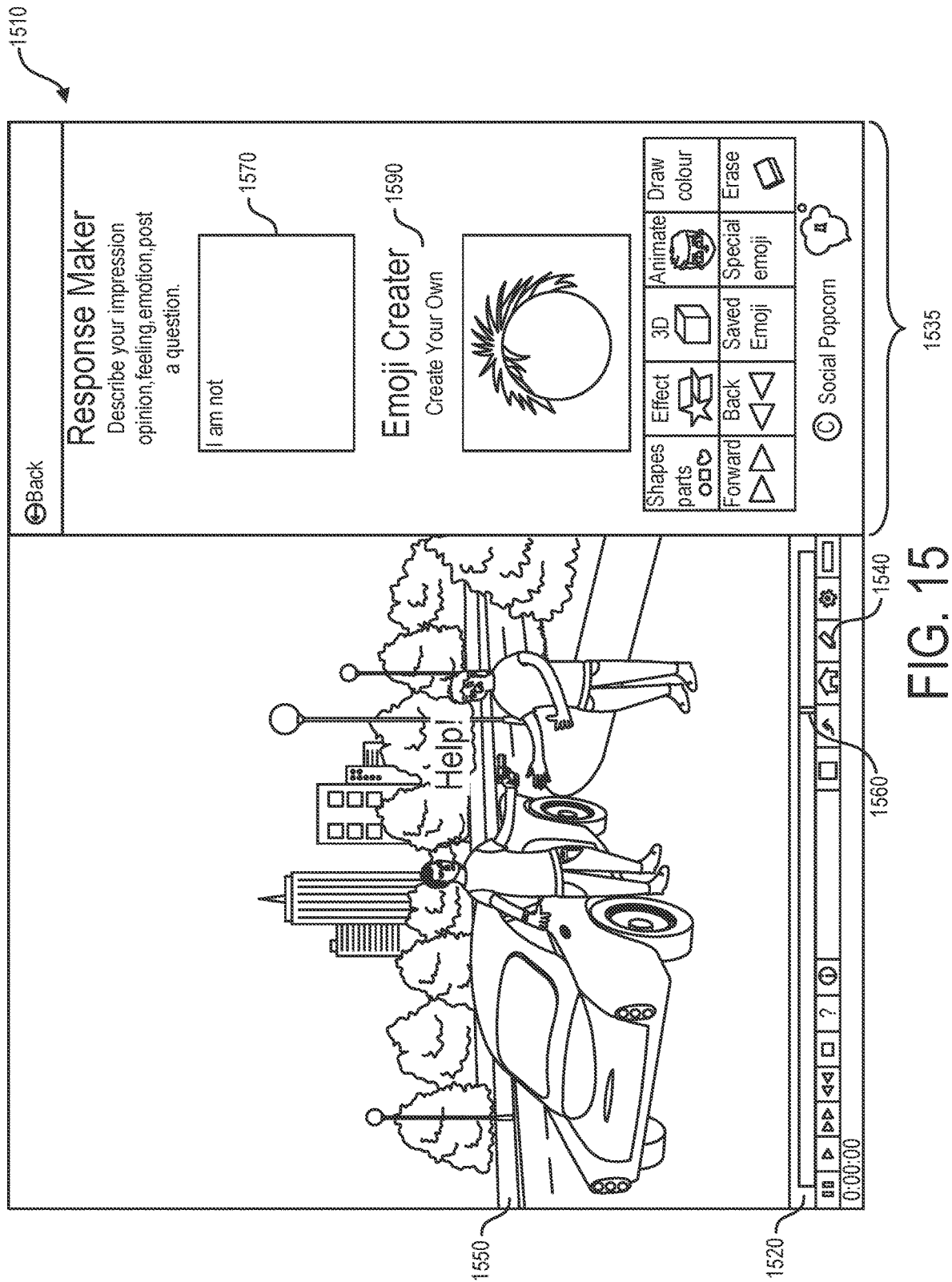
FIG. 15 is a screenshot of a screen of a client device 1510 when a user selected an emoji creator 1590 instead of an emoji table. The user can draw a free-style emoji.

When the emoji creator 1490 is selected as an input modality of the response input unit 1430, a user interface for drawing an emoji is launched 1590, as shown in FIG. 15. Premade shapes & parts may be presented to the user, as well as decorative elements, dynamic effects, 3D symbols, animated symbols, or color variations. The emoji creator 1590 may save created emojis at the database, which the user may retrieve for future use.

In one exemplary embodiment, the virtual platform 310 may be implemented with a first processor 320 and a second processor 320. The first processor 320 tracks a position of a content being consumed by a user. The second processor 320 may retrieve information about previous user responses to the content and reconstruct and display responses as the user's content consumption progresses.

According to several embodiments of the present disclosure, the first processor 320 may receive a command to record a response, in which case the first processor 320 will initiate the response input unit and present input modalities that the user can use. The virtual platform may include a user communication interface 360, a CPU 320, a RAM 330, a ROM 340, an I/O adapter 370, a server 380, and a storage 390.

Figure 2:
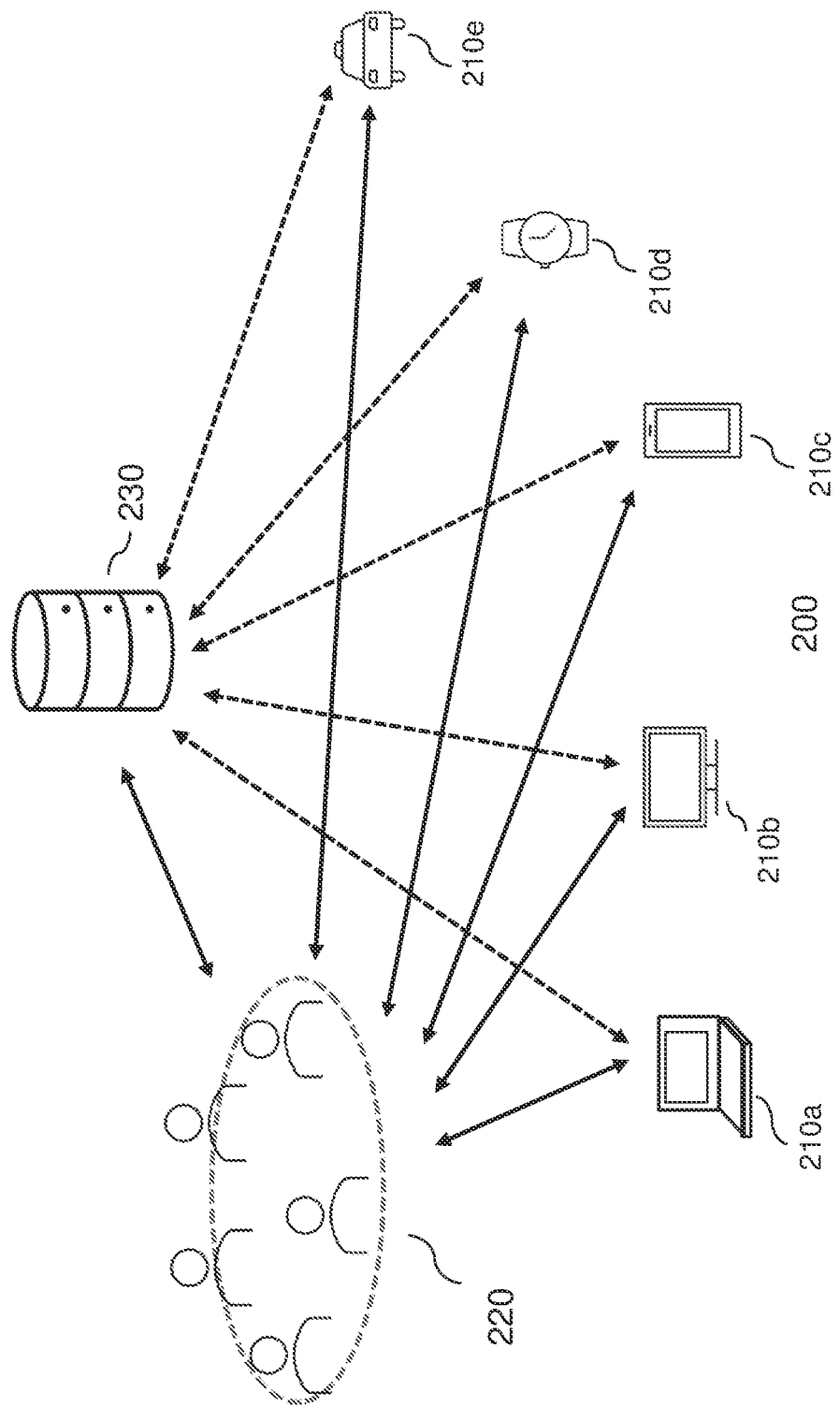
FIG. 2 is a block diagram of a preferred embodiment of the virtual platform 220 that can be implemented when the users, located remotely from each other, access an identical content. The users' content consumption may take place at different times. Client devices (210a, 210b, 210 c, 210d, 210e) may be coupled with each other, or with a display device.
Figure 3:
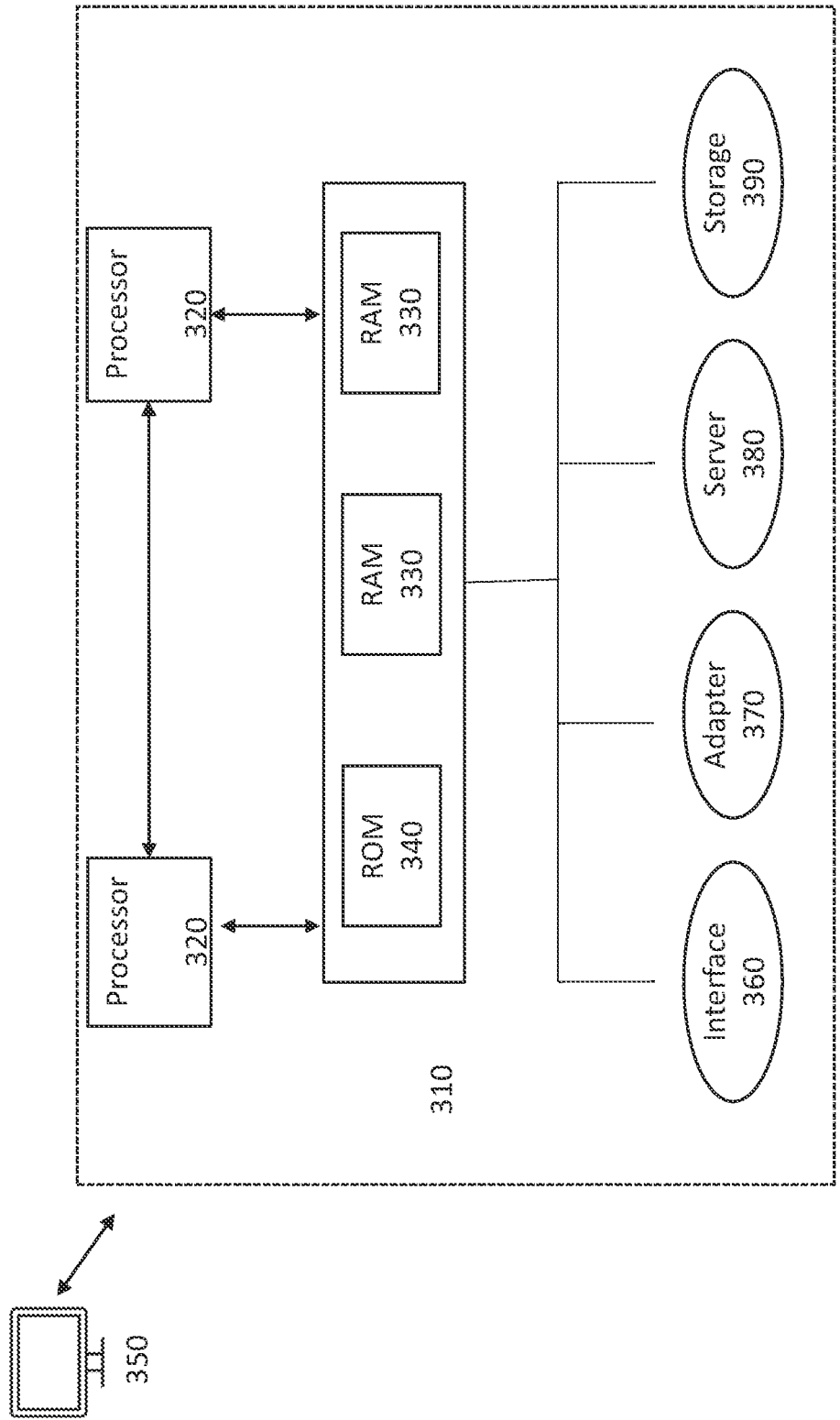
FIG. 3 is a block diagram of an exemplary computer to be implemented within one or more embodiments of the virtual platform 310 employing processors 320, ROM 340, RAM 330, an interface 360, adapters 370, a server 380, and a storage 390. A client device 350 is in data communication with the virtual platform 310.
Figure 4:
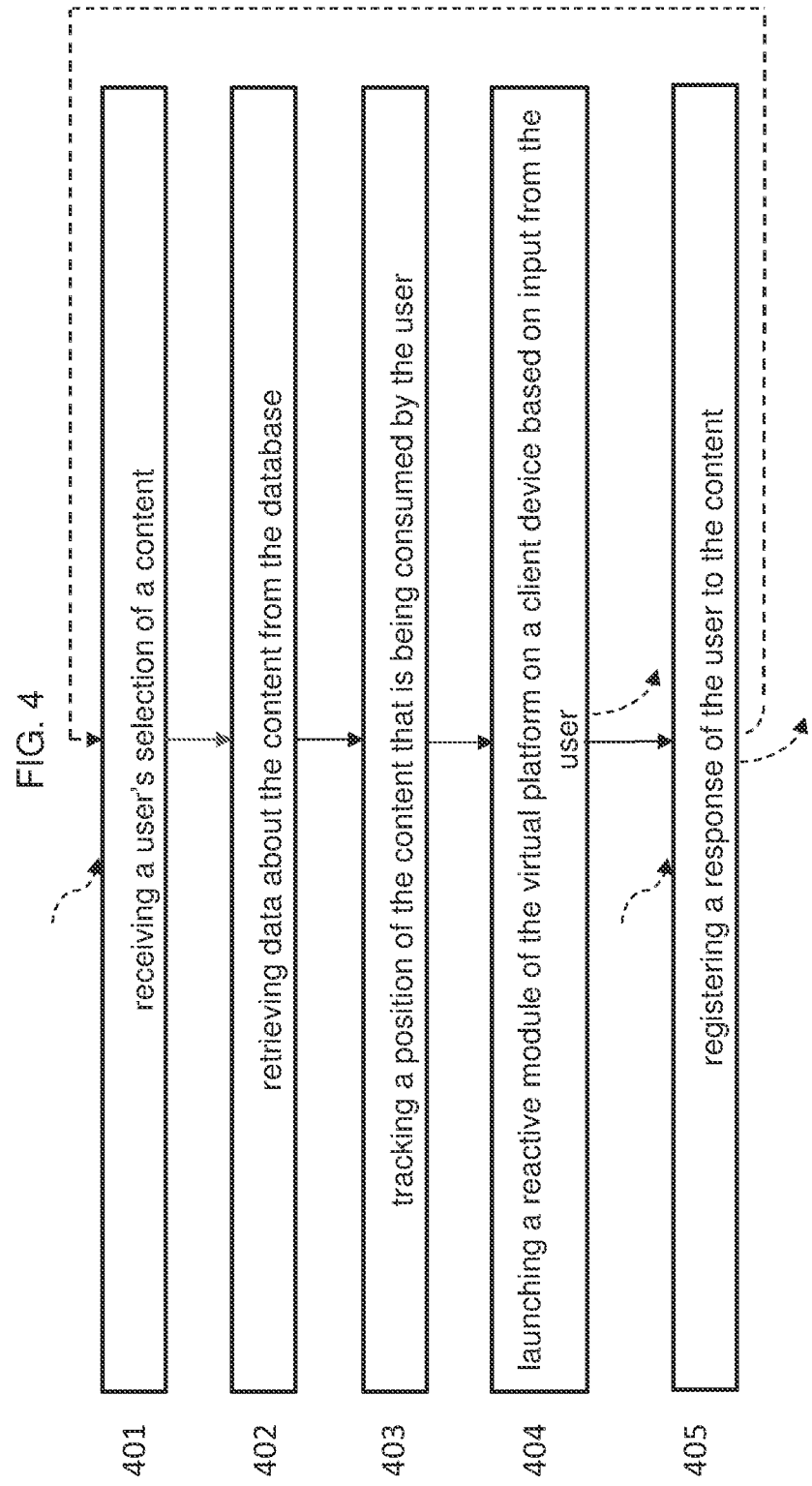
FIG. 4 is a flowchart illustrating a method for registering a user's response to a content.
Figure 5:
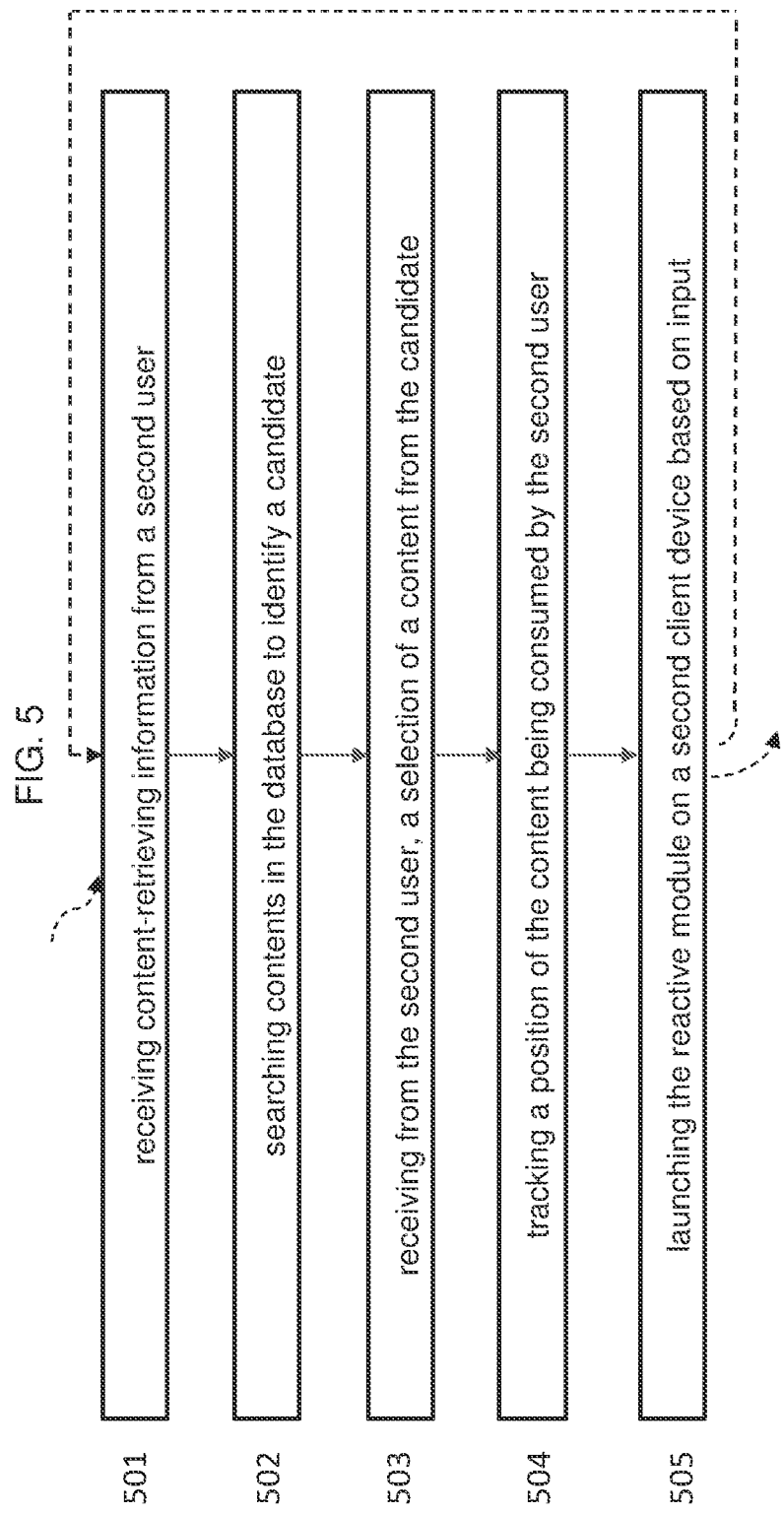
FIG. 5 is a flowchart illustrating a method for searching a content in the database, tracking a position of the content, and launching a reactive module, based on input from a second user.
Figure 6:
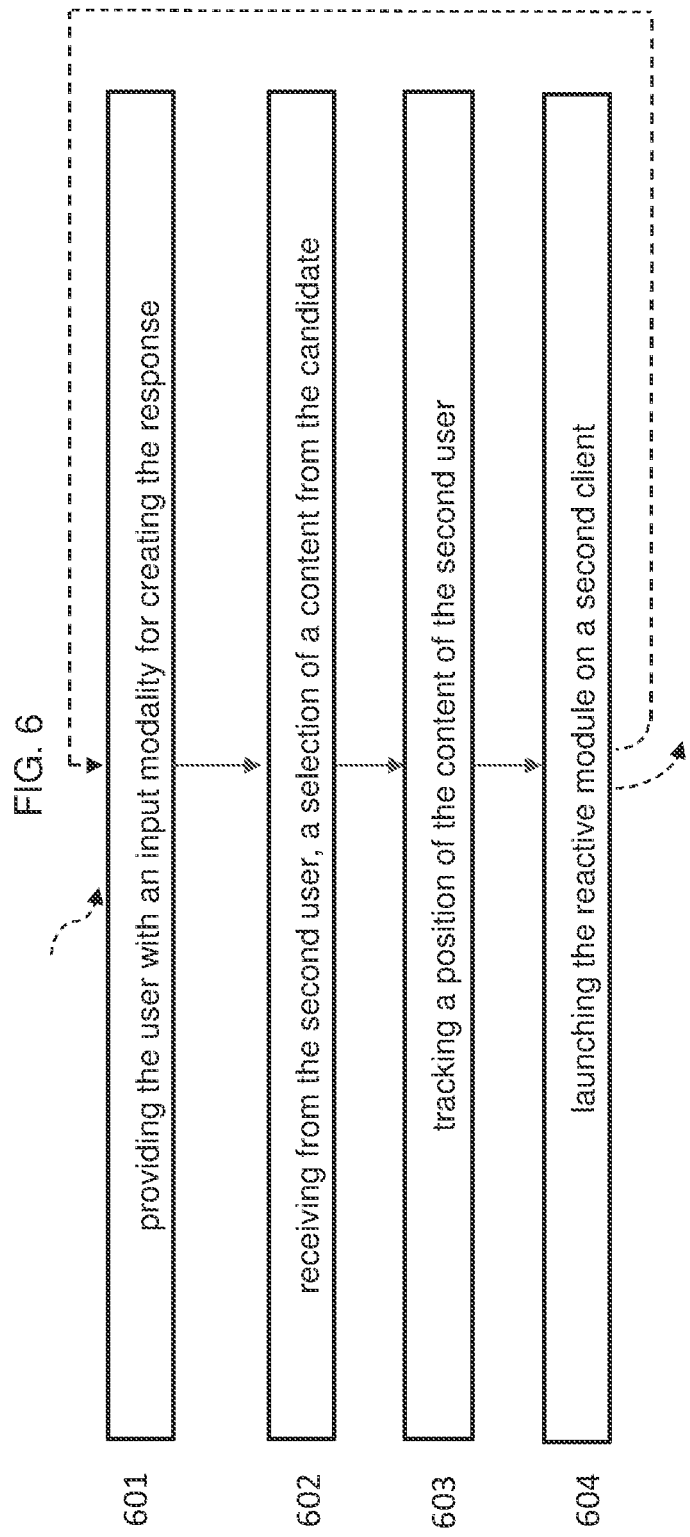
FIG. 6 is a flowchart illustration of a method for providing an input modality, receiving from the second user a selection of a content, tracking a position of the content being consumed, and launching a reactive module.
Figure 7:
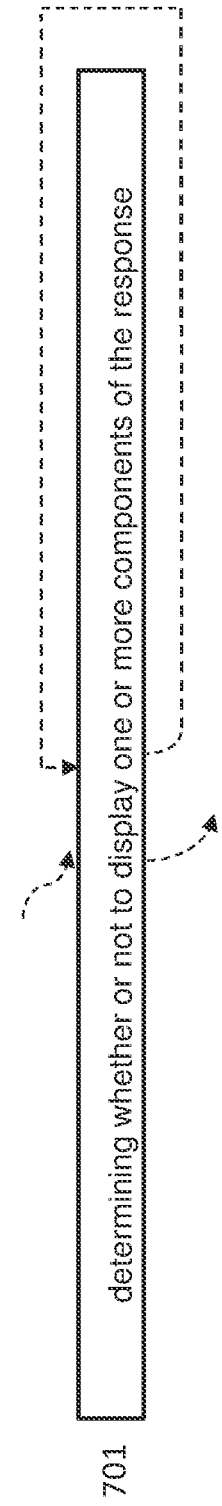
FIG. 7 is a flowchart illustration of a method for determining whether or not to display one or more components of the response.
Figure 8:
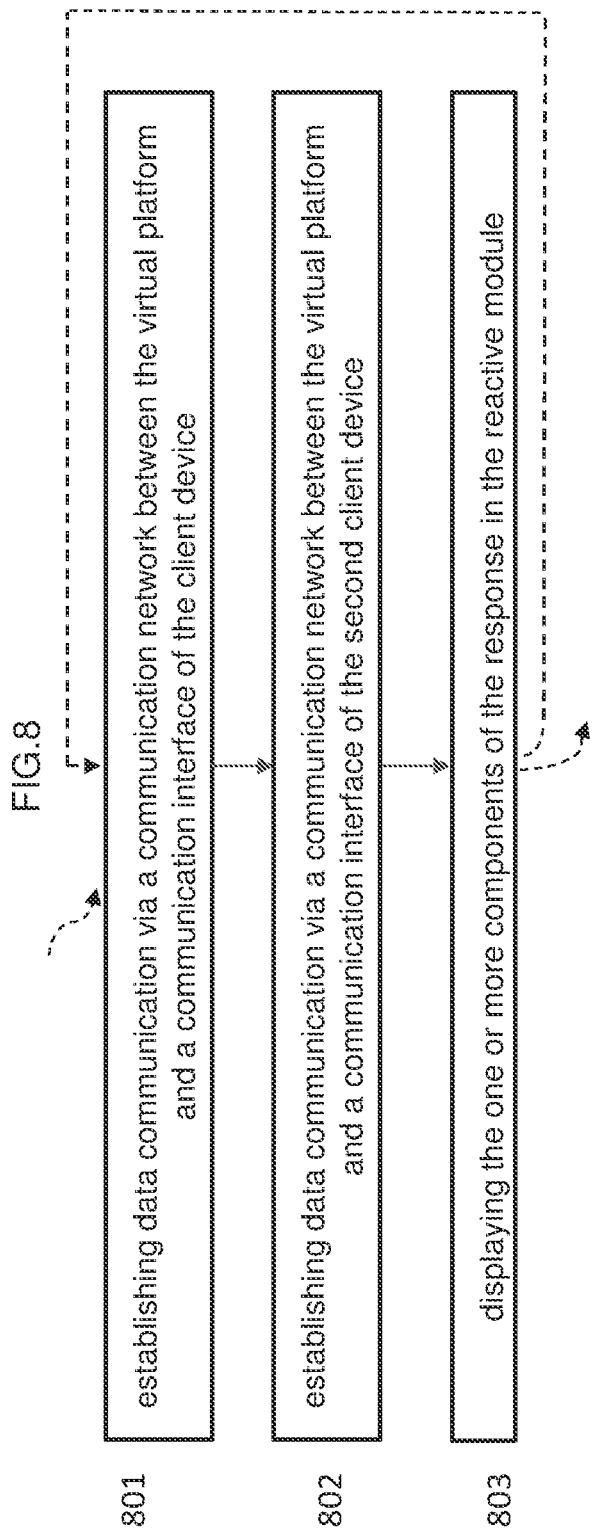
FIG. 8 is a flowchart illustration of a method for establishing data communication between the virtual platform and the client device and the second client device and displaying one or more components of the response in the reactive module.
Figure 9:
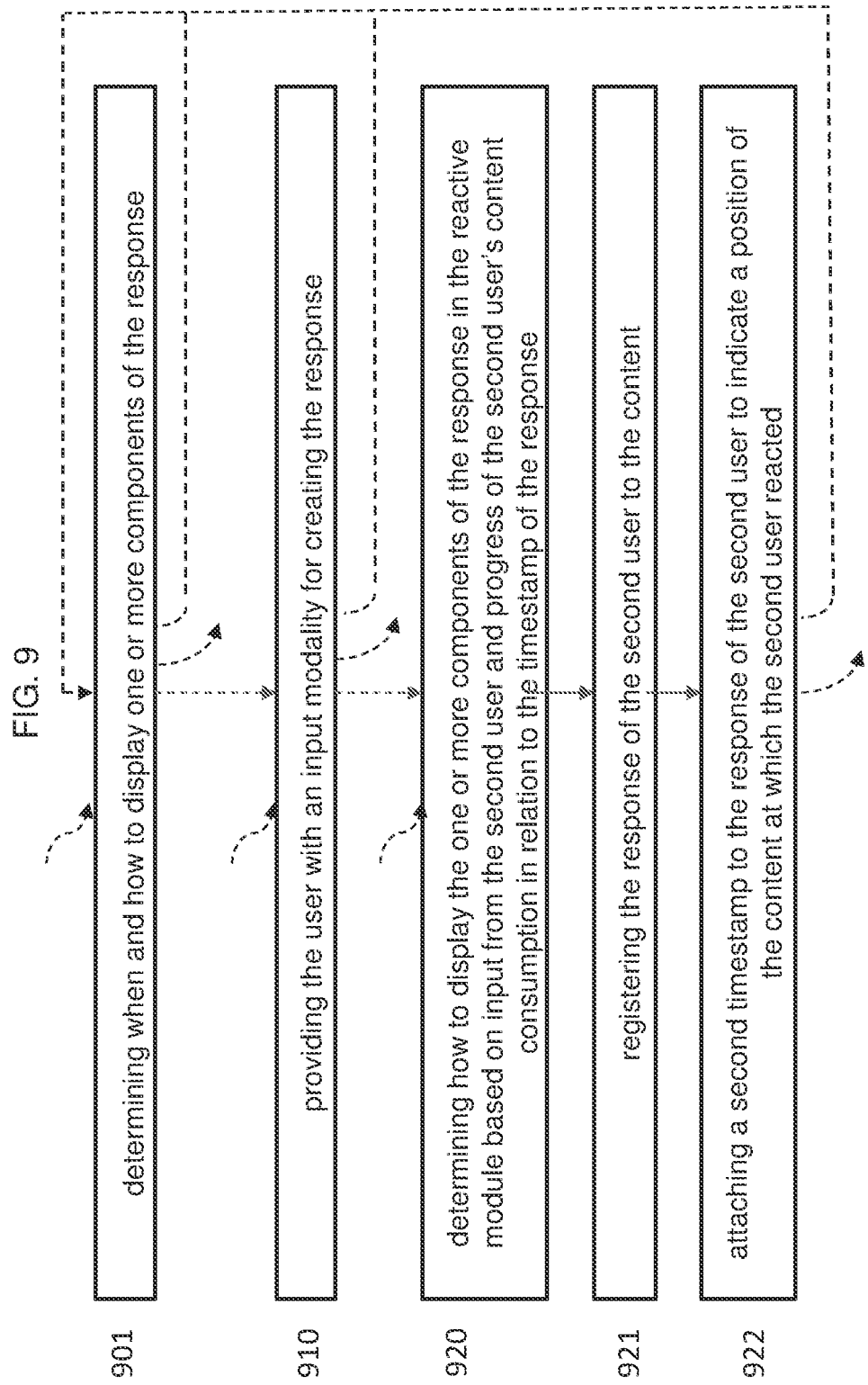
FIG. 9 is a flowchart illustrating the following methods: a method for determining when and how to display one or more components of the response; a method for providing an input modality; and a method for determining how to display the one or more components of the response, registering the response made by the second user, and attaching a timestamp to the response of the second user.
Figure 10:
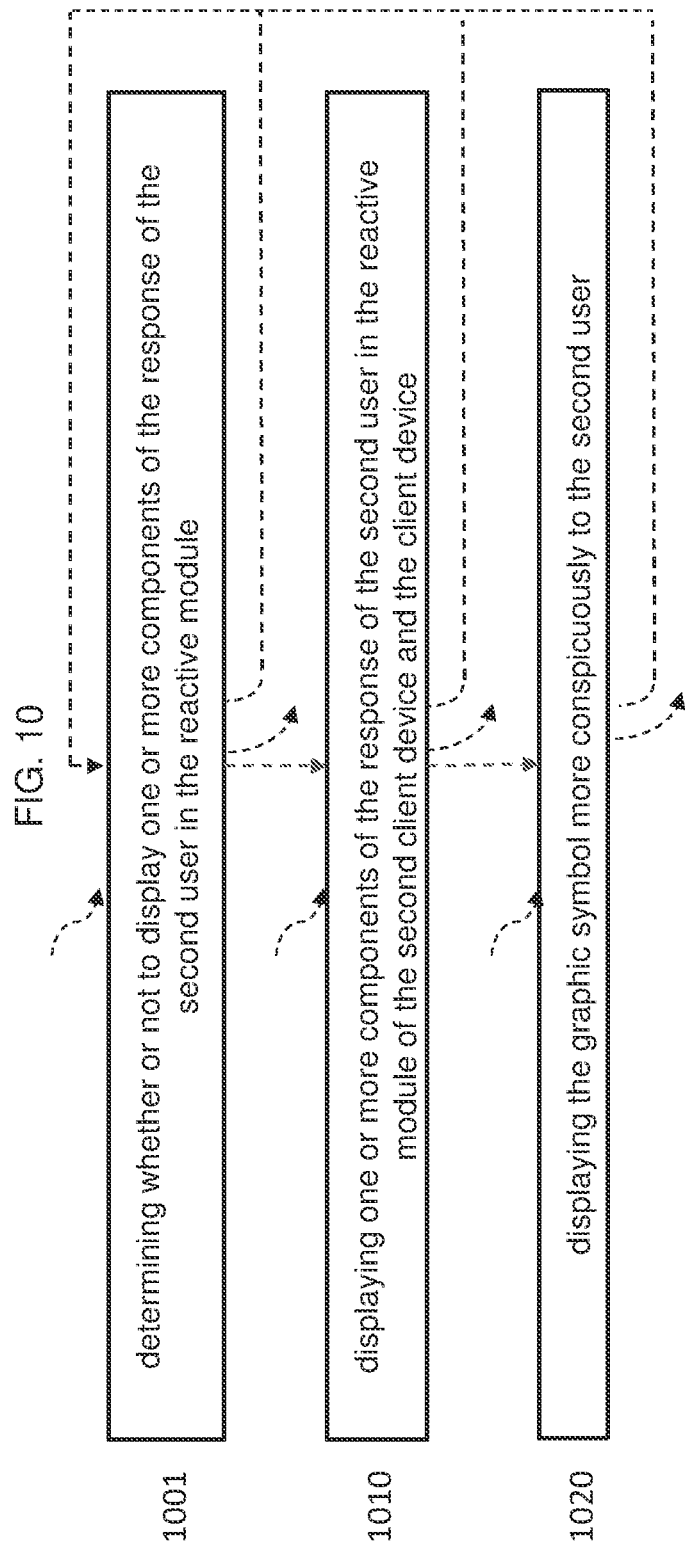
FIG. 10 is a flowchart illustration of the following methods: a method for determining whether or not to display one or more components of the response of the second user; a method for displaying one or more components of the response of the second user in the client device and the second client device; and a method for displaying the graphic symbol more conspicuously to the second user.

The virtual platform of the present disclosure can offer virtually synchronized experiences to users in multimedia settings. As illustrated in FIG. 2, FIG. 11, and FIG. 12, the virtual platform delivers real-time-like interactive environment by displaying a response of another user when the user's content consumption reaches a point at which the response was originally made. This feature of the virtual platform is realized through tracking of the user's content consumption.

In some embodiments, the virtual platform establishes data communication via a communication network with a communication interface of one or more client devices (for example, client devices 210a, 210b, 210c, 210d, and 210e). The client devices' access to a content can be established by the virtual platform according to embodiments of the present disclosure. Optionally, the reactive module 1220 is automatically launched in each client device. In certain embodiments, the virtual platform launches the reactive module 1220 after it confirms that a user has consumed a content before.

According to one embodiment, a user using a first client device (210a) in Los Angeles may consume a content first, and other users may consume the content later in various other locations. The other users using other client devices (210b, 210c, 210d, 210e) can see in the reactive module (1220 in FIG. 12, 1390 in FIG. 13) how the user has commented on the content, at a position of the content at which the user reacted. The reactive module may alter presentation of a graphic symbol and/or a verbal comment of the user in accordance with progress of the watching user's content consumption in relation to the timestamp associated with the user's response. According to a preferred embodiment, representative graphic symbols (1125 in FIG. 11) may be shown in the proximity of a time bar 1150 on other client devices.

In a preferred embodiment, one or more components of the user's response appear in the foreground of the reactive module when the watching user's content consumption reaches a position of the content corresponding to the timestamp of the user's response. For example, the user's verbal comment may appear for three minutes from a position of the content corresponding to the timestamp of the user's response.

Yet in another embodiment, one or more components of the user's response are displayed conspicuously when the user reaches a position of the content corresponding to the timestamp of the user's response. The reactive module may enlarge, flicker, or pulse a graphic symbol as the content consumption passes its timestamp.

Using the reactive module of the virtual platform, the user may create and register a response to the same position of the content that another user registered a response at. Thus, the reactive module may display the user's response as if it were interacting with another user's response.

The processor of the virtual platform may provide a list of graphic symbols 1480 or provide an input modality for free-style creation of a graphic symbol 1490. According to several embodiments of the present disclosure, the responses made by the other users are registered with a timestamp. Responses with a same timestamp are displayed in the same location in relation to a time bar as shown in FIG. 11.

At another aspect, embodiments of the present disclosure concern methods for recording and displaying a user response to a content, including: receiving a user's selection of a content; retrieving data about the content; tracking a position of the content that is being consumed by the user; launching a reactive module of the virtual platform on a client device based on input from the user; and registering a response of the user to the content, the reactive module of the client device being synchronized with the user's content consumption, with a timestamp attached to the response to indicate a position of the content at which the user reacted. The user's response may include a verbal comment and a graphic symbol.

Although the reactive module may be automatically launched, embodiments are not limited to such implementations. Also, one or more modules including the reactive module of the virtual platform may be configured to display the response of the user.

In a preferred embodiment, the graphic symbol indicates a status of the user at the entry of the user's response. The status of the user can include the user's emotional reaction at the position of the content, but any user characteristics may be represented.

Further, the method may comprise receiving content-retrieving information from a second user and searching contents in the database to identify a candidate for the second user's consumption based on the content-retrieving information. The content-retrieving information may include a title, a year of release, a producer, a keyword, and the like.

The method may include receiving from the second user, a selection of a content from the candidate, tracking a position of the content being consumed by the second user. The method may also include launching the reactive module on a second client device based on input from the second user wherein the content selected and consumed by the user is identical to the content selected and consumed by the second user. The method may comprise determining when and how to display one or more components of the response in the reactive module of the second client device, when the second user's content consumption occurs asynchronously from the user's content consumption, and the reactive module of the second client device is synchronized with the second user's content consumption. The one or more components of the response is optionally displayed together with the timestamp. According to a preferred embodiment, the method includes providing the user with an input modality for creating the response, when the graphic symbol indicates the user's emotional reaction at a position of the content at which the user reacted.

Further, the input modality may provide the user with one or more graphic symbols to choose from. The graphic symbol optionally includes an emoji.

As one embodiment, the method comprises: determining whether or not to display one or more components of the response in the reactive module on the second client device, wherein the response comprises a verbal component, and the reactive module of the second client device is synchronized with the second user's content consumption. For example, the reactive module may be launched, and one or more graphic symbols may appear on a screen of the second client device if the second user has consumed the content before. Alternatively, the reactive module may be launched, and previous graphic symbols may appear on a screen if the second user choses to launch the reactive module.

The method may also include: establishing data communication via a communication network between the virtual platform and a communication interface of the client device; establishing data communication via a communication network between the virtual platform and a communication interface of the second client device; and displaying the one or more components of the response in the reactive module of the second client device when progress of the second user's content consumption in relation to the timestamp of the response determines when to display the one or more components of the response, and the graphic symbol is displayed to the second user in one or more modules of the virtual platform including the reactive module.

As one representative embodiment, the method may further include: determining how to display the one or more components of the response in the reactive module based on input from the second user and progress of the second user's content consumption in relation to the timestamp of the response; registering the response of the second user to the content; and attaching a second timestamp to the response of the second user to indicate a position of the content at which the second user reacted, when the response of the second user comprises a second graphic symbol.

According to some embodiments, the method may include determining whether or not to display one or more components of the response of the second user in the reactive module. The method may also comprise displaying one or more components of the response of the second user in the reactive module of the second client device and the client device, when the timestamp and the second timestamp decide how to display the one or more components of the user's response and the one or more components of the second user's response. The method may in certain implementations, comprise displaying the graphic symbol more conspicuously to the second user, when the second graphic symbol indicates an emotional reaction equal to an emotional reaction indicated by the graphic symbol. For example, the graphic symbol may be enlarged in size in the reactive module.

At yet another aspect, embodiments of the present disclosure concern a non-transitory computer-readable medium having stored thereon computer-executable instructions to cause a processor of a virtual platform to implement a method for recording and displaying a user's response to a content. The methods that are executed by the processor are identical or similar to the methods described in preceding paragraphs.

The virtual platform permits users' lively theater-like experience by exposing them to other users' reactions to a content, by implementing tracking of the user's content consumption, timestamping, and registration and reconstruction of previous responses accustomed to the degree of the user's exposure to a content. A response is timestamped to a particular point of a content and stored as a string of data in a database. Unlike existing platforms, the instant disclosure registers and reconstructs previous user responses in a way that creates pseudo-real-time reactions on the virtual platform where users engage in dynamic communications with others while being separated in time and location.

According to another aspect of preferred embodiments, the virtual platform employs a pseudo-synchronized display that schedules responses to appear and/or be spotlighted, at a point of a content at which the responses were originally made. Therefore, whether users watch a movie in remote locations or on multiple instances, users see other users' responses as if they were being made concurrently. Users can enjoy constructed emotional connections with each other and feel a sense of unity.

In addition, the virtual platform provides a medium for an animated user-to-user conversation and facilitates inspiring reactions among content consumers. The reactive module may start a response input unit, in which a graphic symbol is either created or selected. In one embodiment, an emoji is registered as a status of a user in relation to the user's response.

I claim:

1. A method for providing a virtual platform with a database for recording and displaying users' responses to audiovisual contents, comprising:
   receiving a selection of a content;
   retrieving data about the content from the database;
   tracking a position of the content that is being provided to a user of a client device;
   launching a reactive module of the virtual platform on the client device, the reactive module being comprised of a response display unit that playbacks responses of other users and a response input unit that receives a response to the content;
   receiving an input from the client device and determining based on the input whether the response display unit should be visible or invisible to the user of the client device;
   opening the response input unit on the client device when the response starts to be created;
   registering the response in the database;
   receiving content-retrieving information from a second client device;
   searching contents in the database to identify a candidate to be provided to the second client device based on the content-retrieving information;
   receiving from the second client device, a selection of a second content from the candidate;
   tracking a position of the second content that is being provided on the second client device;
   launching the reactive module on the second client device;
   receiving a second input from the second client device and determining whether the response display unit should be visible or invisible while the second content is being provided;
   determining when and how to display one or more components of the response on the second client device;
   determining how to display the one or more components of the response in the reactive module of the second client device based on the second input onto the second client device and progress of provision of the second content in relation to the timestamp of the response;
   registering a second response to the second content in the database as received from the second client device;
   attaching a second timestamp to the second response to indicate a position of the second content at which the second response was received;
   determining whether or not to stop displaying one or more components of the second response in the reactive module of the second client device based on the second input,
   changing a graphic symbol to a more conspicuous form on the second device as a result of registration of the second response,
   wherein the content is identical to the second content,
   wherein the response comprises the graphic symbol,
   wherein the second response comprises a second graphic symbol, and the second graphic symbol indicates an emotional reaction equal to an emotional reaction indicated by the graphic symbol,
   wherein a timestamp is attached to the response to indicate a position of the content at which the user of the client device reacted,
   wherein the response display unit is visible on the second client device based on the second input,
   wherein the second content is provided asynchronously from the content,
   wherein the reactive module of the second client device is synchronized with provision of the second content,
   wherein the timestamp and the second timestamp decide how to display the one or more components of the response and the one or more components of the second response and
   wherein the graphic symbol indicates emotional reaction at a position of the content at which the user of the client device reacted.

2. A system for recording and displaying users' responses to contents, comprising a client device with a communication interface; and a virtual platform, wherein the virtual platform comprises: a database and a processor, wherein the processor is configured to:
   receive a selection of a content;
   retrieve data about the content from the database;
   track a position of the content that is being provided to a user of a client device;
   launch a reactive module of the virtual platform on the client device, the reactive module being comprised of a response display unit that playbacks responses of other users and a response input unit that receives a response to the content;
   receive an input from the client device and determining based on the input whether the response display unit should be visible or invisible to the user of the client device;
   open the response input unit on the client device when the response starts to be created;
   register the response in the database;
   receive content-retrieving information from a second client device;
   search contents in the database to identify a candidate to be provided to the second client device based on the content-retrieving information;
   receive from the second client device, a selection of a second content from the candidate;
   track a position of the second content that is being provided on the second client device;
   launch the reactive module on the second client device;
   receive a second input from the second client device and determining whether the response display unit should be visible or invisible while the second content is being provided;
   determine when and how to display one or more components of the response on the second client device;
   determine how to display the one or more components of the response in the reactive module of the second client device based on the second input onto the second client device and progress of provision of the second content in relation to the timestamp of the response;
   register a second response to the second content in the database as received from the second client device;
   attach a second timestamp to the second response to indicate a position of the second content at which the second response was received;
   determine whether or not to stop displaying one or more components of the second response in the reactive module of the second client device based on the second input,
   change a graphic symbol to a more conspicuous form on the second device as a result of registration of the second response,
   wherein the content is identical to the second content,
   wherein the response comprises the graphic symbol,
   wherein the second response comprises a second graphic symbol, and the second graphic symbol indicates an emotional reaction equal to an emotional reaction indicated by the graphic symbol, wherein a timestamp is attached to the response to indicate a position of the content at which the user of the client device reacted, wherein the response display unit is visible on the second client device based on the second input, wherein the second content is provided asynchronously from the content, wherein the reactive module of the second client device is synchronized with provision of the second content, wherein the timestamp and the second timestamp decide how to display the one or more components of the response and the one or more components of the second response and wherein the graphic symbol indicates emotional reaction at a position of the content at which the user of the client device reacted.

3. A non-transitory computer-readable medium having stored thereon computer-executable instructions to cause a processor of a virtual platform to implement a process for recording and displaying users' response to contents, comprising:

receiving a selection of a content;

retrieving data about the content from the database;

tracking a position of the content that is being provided to a user of a client device;

launching a reactive module of the virtual platform on the client device, the reactive module being comprised of a response display unit that playbacks responses of other users and a response input unit that receives a response to the content;

receiving an input from the client device and determining based on the input whether the response display unit should be visible or invisible to the user of the client device;

opening the response input unit on the client device when the response starts to be created;

registering the response in the database;

receiving content-retrieving information from a second client device;

searching contents in the database to identify a candidate to be provided to the second client device based on the content-retrieving information;

receiving from the second client device, a selection of a second content from the candidate;

tracking a position of the second content that is being provided on the second client device;

launching the reactive module on the second client device;

receiving a second input from the second client device and determining whether the response display unit should be visible or invisible while the second content is being provided;

determining when and how to display one or more components of the response on the second client device;

determining how to display the one or more components of the response in the reactive module of the second client device based on the second input onto the second client device and progress of provision of the second content in relation to the timestamp of the response;

registering a second response to the second content in the database as received from the second client device;

attaching a second timestamp to the second response to indicate a position of the second content at which the second response was received;

determining whether or not to stop displaying one or more components of the second response in the reactive module of the second client device based on the second input, changing a graphic symbol to a more conspicuous form on the second device as a result of registration of the second response, wherein the content is identical to the second content, wherein the response comprises the graphic symbol, wherein the second response comprises a second graphic symbol, and the second graphic symbol indicates an emotional reaction equal to an emotional reaction indicated by the graphic symbol, wherein a timestamp is attached to the response to indicate a position of the content at which the user of the client device reacted, wherein the response display unit is visible on the second client device based on the second input, wherein the second content is provided asynchronously from the content, wherein the reactive module of the second client device is synchronized with provision of the second content, wherein the timestamp and the second timestamp decide how to display the one or more components of the response and the one or more components of the second response and wherein the graphic symbol indicates emotional reaction at a position of the content at which the user of the client device reacted.

* * * * *